(12) United States Patent
Finkelstein (10) Patent No.: US 9,083,649 B2
(45) Date of Patent: Jul. 14, 2015

(54) SYSTEMS AND METHODS FOR MANAGING NETWORK BANDWIDTH VIA CONTENT BUFFERING

(75) Inventor: Jeff Finkelstein, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 44 days.

(21) Appl. No.: 13/540,213

(22) Filed: Jul. 2, 2012

(65) Prior Publication Data

US 2014/0003238 A1 Jan. 2, 2014

(51) Int. Cl.
*H04L 12/24* (2006.01)
*H04L 12/873* (2013.01)

(52) U.S. Cl.
CPC .................................... *H04L 47/52* (2013.01)

(58) Field of Classification Search
CPC ......... H04L 47/30; H04L 47/32; H04L 47/10; H04L 47/2441; H04L 12/5693; H04L 45/00
USPC ................. 370/235, 389, 474, 353, 503, 230, 370/230.1
See application file for complete search history.

(56) References Cited

U.S. PATENT DOCUMENTS

| | | | | |
|---|---|---|---|---|
| 5,029,124 | A * | 7/1991 | Leahy et al. | 710/105 |
| 5,418,747 | A * | 5/1995 | Tobita | 365/194 |
| 6,574,224 | B1 | 6/2003 | Brueckheimer et al. | |
| 6,874,036 | B2 * | 3/2005 | Rawson, III | 709/246 |
| 6,980,530 | B2 * | 12/2005 | Reddy | 370/316 |
| 7,760,669 | B2 * | 7/2010 | Heil et al. | 370/258 |
| 7,826,399 | B2 * | 11/2010 | Heil et al. | 370/258 |
| 7,889,765 | B2 * | 2/2011 | Brooks et al. | 370/505 |
| 7,983,268 | B1 * | 7/2011 | Wingfield | 370/395.1 |
| 8,060,909 | B2 | 11/2011 | Krikorian et al. | |

(Continued)

FOREIGN PATENT DOCUMENTS

DE 102008039580 A1 * 3/2010

OTHER PUBLICATIONS

ETSI TS 36.211 Version 8.3.0 Release 8, Physical Channels and Modulation, Nov. 2008.*

(Continued)

*Primary Examiner* — Melvin Marcelo
*Assistant Examiner* — Peter Solinsky
(74) *Attorney, Agent, or Firm* — Sutherland Asbill & Brennan LLP (57) ABSTRACT

Systems and methods for buffering or delaying data packets to facilitate optimized distribution of content associated with the data packets are disclosed. Data packets sent from content providers may be received by a service provider, where information associated with the data packets may be identified. The identified information may be used to associate the data packets with an intended destination for the data packets and identify a type of the data packets, such as a video data packet. Video data packets (and other data packets) may be buffered or delayed such that more time-critical data packets may be accelerated into one or more QAM channels carrying the content. The delayed data packets may be time-sliced into the one or more QAM channels, which may displace empty slots or gaps that may waste bandwidth associated with the QAM channels.

19 Claims, 4 Drawing Sheets

(56) References Cited

U.S. PATENT DOCUMENTS

| | | | |
|---|---|---|---|
| 8,516,151 B2* | 8/2013 | Lacroute et al. | 709/240 |
| 2002/0056125 A1 | 5/2002 | Hodge et al. | |
| 2003/0001948 A1* | 1/2003 | Mochizuki | 348/14.01 |
| 2006/0056424 A1* | 3/2006 | Lih et al. | 370/401 |
| 2009/0222873 A1* | 9/2009 | Einarsson | 725/115 |
| 2010/0049885 A1* | 2/2010 | Chandra et al. | 710/36 |
| 2010/0060792 A1* | 3/2010 | Corlett et al. | 348/583 |
| 2010/0189122 A1* | 7/2010 | Dandekar et al. | 370/412 |
| 2011/0055416 A1* | 3/2011 | Chen et al. | 709/231 |
| 2011/0128961 A1* | 6/2011 | Brooks et al. | 370/392 |
| 2011/0142052 A1* | 6/2011 | Kulkarni et al. | 370/392 |
| 2012/0106447 A1* | 5/2012 | Yousefi et al. | 370/328 |
| 2012/0109406 A1* | 5/2012 | Yousefi et al. | 701/1 |
| 2012/0173905 A1* | 7/2012 | Diab et al. | 713/320 |
| 2012/0327950 A1* | 12/2012 | Gotz et al. | 370/412 |
| 2013/0114598 A1* | 5/2013 | Schrum et al. | 370/392 |
| 2013/0114606 A1* | 5/2013 | Schrum et al. | 370/395.53 |
| 2013/0166856 A1* | 6/2013 | Lim et al. | 711/154 |
| 2013/0227080 A1* | 8/2013 | Gao et al. | 709/219 |
| 2013/0235725 A1* | 9/2013 | Lamb et al. | 370/235 |

OTHER PUBLICATIONS

Liu, N.H., Yeung, Kwan, A New Packet Scheduling Algorithm for Input-buffered Multicast Packet Switches, 0-7803-4198-8/97/$10.00 0 1997 IEEE.*

Bae, Geuntae, Kim, Jaesub, Kim, Daewon, Park, Daeyeon, Low-Power Multimedia Scheduling Using Output Pre-buffering, Proceedings of the 13th IEEE International Symposium on Modeling, Analysis, and Simulation of Computer and Telecommunication Systems (MASCOTS'05) 1526-7539/05 $20.00 © 2005 IEEE.*

Chan, Gary, Kobayashi, Hisashi, Packet Scheduling Algorithms and Performance of a Buffered Shufflenet with Deflection Routing, Journal of Lightwave Technology, vol. 18, No. 4, Apr. 2000, pp. 490-501.*

Pan, Deng and Yang, Yuanyuan, Buffer Management for Lossless Service in Network Processors, Proceedings of the 14th IEEE Symposium on High-Performance Interconnects (HOTI'06) 0-7695-2654-3/06 $20.00 © 2006.*

* cited by examiner

SYSTEMS AND METHODS FOR MANAGING NETWORK BANDWIDTH VIA CONTENT BUFFERING

TECHNICAL FIELD

Embodiments of this disclosure relate generally to electronic content, and more particularly, to distributing electronic content.

BACKGROUND

Service providers, such as cable or satellite providers, may send content to customer or user locations where it may be viewed and/or interacted with by a user using one or more devices at the user location. For example, content, such as video content, may be viewed by a user using a set-top box connected to a television or other display device at a user location. The content may be sent to the user location as data streams using various formats, such as Quadrature Amplitude Modulation (QAM), which may include one or more encoded channels carrying the content. The rate of content delivery sent to a user location may vary according to various compression techniques that may be applied to QAM channels, such as MPEG or MPEG-4 compression, which may increase the amount of content that may be included in a standard, 6-MHz (or other) QAM channel. Despite the use of such compression and other techniques, a significant amount of the bandwidth in QAM channels may be wasted. Such waste may result from existing service provider systems filling QAM channels with data packets in a non-deterministic fashion, which may cause null values or gaps to be included in the QAM channels. Such gaps may prevent even more content from being included in QAM channels, which may result in inefficient and less cost-effective transmission of content to user locations.

BRIEF DESCRIPTION

Some or all of the above needs and/or problems may be addressed by certain embodiments of the disclosure. Certain embodiments may include systems and methods for buffering or delaying data packets to optimize the transmission of content associated with the data packets. According to one embodiment, there is disclosed a system including at least one memory and at least one processor configured to execute computer-executable instructions in the memory to receive a plurality of data packets associated with content, identify a type of each of the plurality of data packets and a destination for each of the plurality of data packets, and store one or more data packets of the plurality of data packets in a respective queue associated with a destination for the one or more data packets. The at least one processor may also be configured to execute the computer-executable instructions in the memory to determine a schedule for sending the one or more data packets to fill an output buffer, wherein the schedule comprises sending a first data packet, then sending a second data packet after the first data packet at a predetermined delay after the first data packet. The at least one processor may be further configured to send the plurality of data packets to the output buffer based at least in part on the schedule.

According to another embodiment, there is disclosed a method for receiving, at a cable provider system comprising one or more computers, a plurality of data packets associated with content from a content provider. The method also includes identifying, by the cable provider system, the content provider, a type of each of the plurality of data packets, and a destination for each of the plurality of data packets. The method further includes storing, by the cable provider system, one or more data packets of the plurality of data packets in a queue associated with a destination for the one or more data packets. The method further includes determining, by the cable provider system, a bandwidth of the output buffer, and calculating, by the cable provider system, a fill level of the output buffer based at least in part on the bandwidth. When the fill level is less than the bandwidth or a desired level, the method further includes sending, by the cable provider system, to the output buffer, a first data packet of the one or more data packets and a second data packet of the one or more data packets, wherein the second data packet is sent at a predetermined delay after the first data packet.

According to a further embodiment, there is disclosed one or more computer-readable media storing computer-executable instructions that, when executed by at least one processor, configure the at least one processor to perform operations. Such operations include receiving a plurality of data packets associated with content from a content provider, and identifying the content provider, a type of each of the plurality of data packets, and a destination for each of the plurality of data packets. The type of each of the plurality of data packets is based at least in part on a data port on which the plurality of data packets are received. The at least one processor may be configured to perform further operations including scheduling the sending of one or more data packets of the plurality of data packets to fill an output buffer. Such scheduling may include sending a time dependent data packet and sending a time independent data packet after sending the time dependent data packet. The time independent data packet is sent at a predetermined delay after the time dependent data packet.

Other embodiments, systems, methods, aspects, and features of the invention will become apparent to those skilled in the art from the following detailed description, the accompanying drawings, and the appended claims.

BRIEF DESCRIPTION OF THE FIGURES

The detailed description is set forth with reference to the accompanying drawings, which are not necessarily drawn to scale. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Illustrative embodiments herein are directed to, among other things, optimized transmission of electronic content, such as text, video, audio, multimedia, and/or other data. Such content may be received by a service provider from a provider of the content (hereafter the "content provider") as one or more data packets associated with the content. Various information associated with each data packet may be determined, such as the content provider, a destination for the data packet, and a type associated with the data packet. Such information may be used by a service provider device to implement optimized transmission of the data packets to user locations, in one example. For example, according to one embodiment, data packets may be stored in a queue associated with their destination, such as a user location, in a memory of the service provider device such that multiple queues may exist. The data packets may be sent from the user queues to an output buffer, for example, a single aggregated output buffer that may include data packets from multiple user queues.

Certain embodiments herein relate to determining whether the aggregated output buffer is being filled with data packets in a manner that may facilitate optimized transmission of the data packets, and thus, optimized delivery of the content. Such a determination may include calculating a fill level (or fill percentage) of the aggregated output buffer (which may indicate an amount of unused bandwidth in one or more QAM channels associated with the aggregated output buffer) and comparing the fill level to a predetermined or desired fill level. If a desired fill level is not being attained, in one embodiment, the data packets may be sent to the aggregated output buffer according to a schedule that may more optimally fill the aggregated output buffer, and thereby increases the amount of content that may be transmitted, for example, in a QAM channel. Such a schedule may include implementing a predetermined delay for certain types of data packets. By delaying some data packets, other data packets may be accelerated into the aggregated output buffer. Any existing gaps (or unused bandwidth) in the aggregated output buffer may thereafter be reduced by the delayed data packets, which may be accordingly time-sliced into the aggregated output buffer.

Certain types of data packets may be better candidates for buffering or delaying than other types of data packets. Data packets that may be delayed, according to certain embodiments herein, include video data packets, data packets associated with electronic mail, or other data packets whose delayed delivery may not adversely affect a user's viewing and/or interaction with content associated with the data packets, or otherwise may not interrupt the presentation of the content to a user. Video packets, for example, may be ordinarily buffered in a set-top box such that an additional delay, for example, up to 50 milliseconds, may not affects a user's viewing of the content. Video conferencing data packets or voice data packets, on the other hand, may adversely affect a user's interaction with the content and therefore may not be delayed, according to certain embodiments herein.

In one embodiment, once an aggregated output buffer has been filled, the data packets therein may be sent to their respective destinations by a service provider via one or more QAM channels or data streams including the data packets. The data packets may be converted from their Transmission Control Protocol/Internet Protocol ("TCP/IP" or "IP") format to a radio frequency (RF) format for sending to user locations.

The technical effects of certain embodiments herein may include an increased offering of the number of channels (or content) provided by a cable service provider using existing bandwidths, which may, among other benefits, increase revenues associated with delivering content to users.

Figure 1:
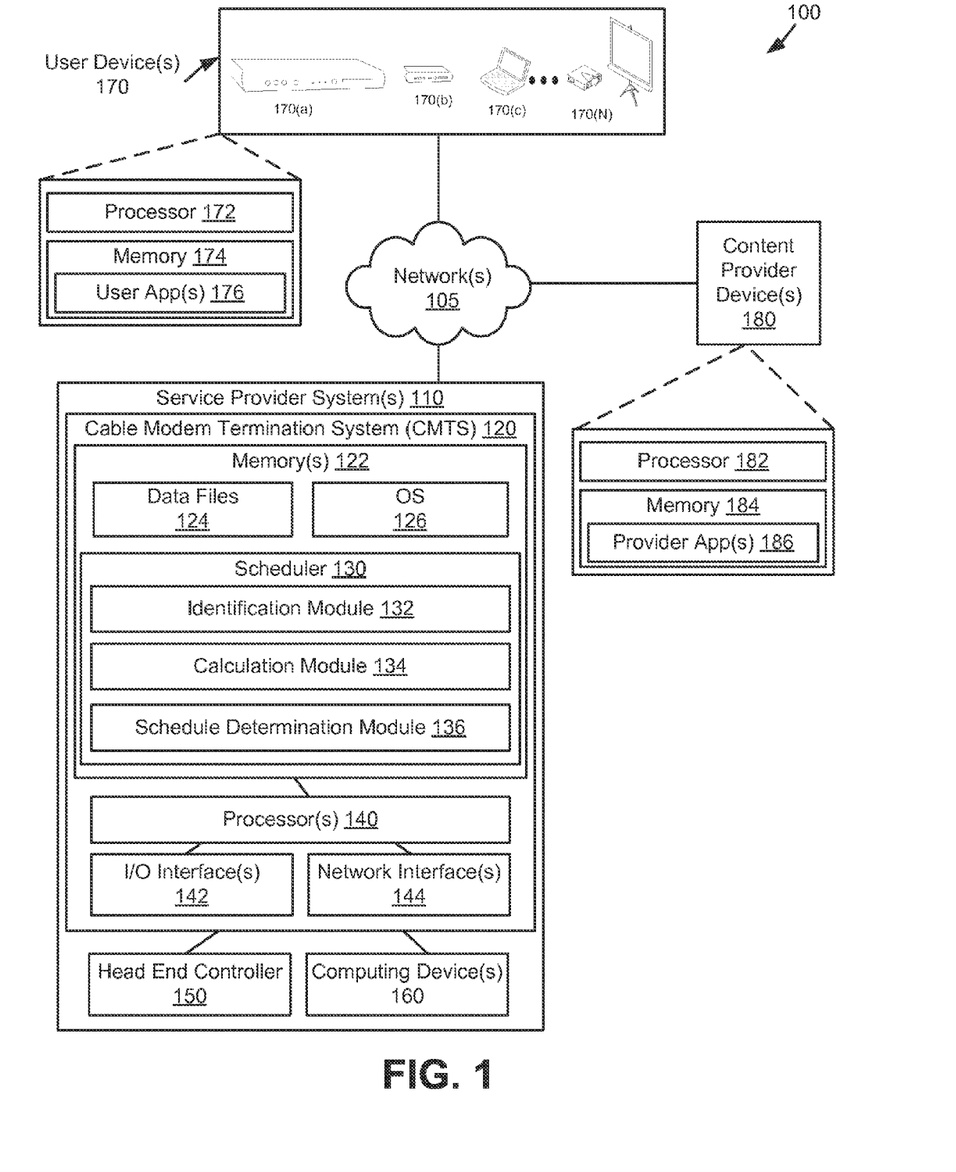
FIG. 1 illustrates a block diagram of an example computing environment that may be utilized to buffer data packets to optimize the transmission of content associated with the data packets, according to an embodiment of the disclosure.

FIG. 1 illustrates a block diagram of an example computing environment that may be utilized to buffer data packets to optimize the transmission of content associated with the data packets, according to an embodiment of the disclosure. The computing environment 100 may include, but is not limited to, one or more service provider systems 110, one or more user devices 170, and one or more content providers 180. Each of these systems or devices may communicate with one another via one or more networks 105 to facilitate optimized transmission of content to user locations as described herein. According to certain embodiments, a service provider system 110 may receive content, such as text, video, audio, multimedia, etc. from a content provider 180, such as a television network. The one or more service provider systems 110 may include other systems or devices that may analyze, prepare, and distribute the content to one or more user devices 170, such as, but not limited to, customer premise equipment such as a set-top box 170(a) or cable modem 170(b), which may be connected to user devices, such as a computing device 170(c) or a video conferencing device and display 170(N) for presenting content to a user.

As used herein, the term "device" may refer to any computing component that includes one or more processors that can be configured to execute computer-readable, computer-implemented, or computer-executable instructions. Example devices can include personal computers, server computers, digital assistants, smart phones, personal digital assistants, digital tablets, Internet appliances, application-specific circuits, microcontrollers, minicomputers, transceivers, customer premise equipment such as set-top boxes, kiosks, or other processor-based devices. The execution of suitable computer-implemented instructions by one or more processors associated with various devices may form special purpose computers or other particular machines that may facilitate management of event sequences as described herein.

The one or more networks 105 may include any number of wired or wireless networks that can enable various computing devices in the example computing environment 100 to communicate with one another. In other embodiments, other networks, intranets, or combinations of different types of networks may be used, including, but not limited to, the Internet, intranets, cable networks, cellular networks, landline-based networks, or other communication mediums connecting multiple computing devices to one another. Other embodiments may not involve a network and may, for example, provide features on a single device or on devices that are directly connected to one another. For example, the service provider system 110 may be directly connected to a content provider device 180.

The service provider system 110 may include various devices, such as a cable model termination system (CMTS) 120, a head end controller 150, and one or more computing devices 160. Each of these devices may include one or more processors, memory, input/output ("I/O") interfaces, and network interfaces to facilitate the processes described herein. For example, the CMTS 120 may include one or more processors 140 configured to communicate with one or more memory devices 122, input/output ("I/O") interfaces 142, and one or more network interfaces 144 that may allow the CMTS 120 to communicate with various other devices connected to the network 105. Although only one CMTS 120 device is shown, the operations and/or control of the CMTS 120 may be distributed among any number of other devices, systems, computers, and/or processing components in addition to those that may be present in the service provider system 110. For example, at least some of the functions performed by the CMTS 120 (as will be discussed in greater detail below) may be performed by the head end controller 150, one or more of the computing devices 160, or a combination of these devices.

The memory devices 122 may include any number of suitable memory devices, such as caches, read-only memory devices, random access memory devices, magnetic storage devices, etc. The memory devices 122 can store data, executable instructions, and/or various program modules utilized by the processor 140. The various program modules are discussed in greater detail in the following sections.

The one or more I/O interfaces 142 may enable communication between one or more I/O devices including, but not limited to, one or more user interface devices such as a display, keypad, mouse, pointing device, control panel, touch screen display, remote control, microphone, speaker, etc., that may facilitate user interaction with service provider systems 110. The network interfaces 144 may facilitate a connection between the CMTS 120 and other devices via the network 105. In one embodiment, the network interfaces 144 may include one or more line cards (for example, modular electronic circuits on a printed circuit board that may interface with a service provider network) that may receive data packets from a content provider device 180 via TCP/IP and convert the TCP/IP data packets to RF for transmission to the user devices 170.

The head end controller 150, the computing devices 160, the user devices 170, and the content provider devices 180 may also include one or more processors, memory devices, I/O interfaces, and network interfaces to enable them to perform various functions associated with optimized transmission of content (as will be discussed in greater detail below). For example, the user devices 170 and content provider 180 may include a processor 172 and 182, respectively, and a memory 174 and 184, respectively. The user devices 170 may include one or more user applications 176 that may enable a user to view and/or interact with content received from the service provider system 110. The content provider device 180 may include one or more provider applications 186 that may manage the distribution of content from the content provider device 180 to the service provider system 110.

Turning to the contents of the memory 122 in the CMTS 120, the memory 122 may include data files 124, an operating system ("OS") 126, and various software programs and/or modules that may implement the optimized distribution of data packets to user locations.

The data files 124 may include any suitable data that facilitates such optimized transmission. Examples of such data may include, but is not limited to, that data which may be used to determine the type of data packets that may be delayed, the duration of the delay, thresholds that may be used to determine whether the aggregated output buffer is being optimally filled, other scheduling information associated with sending data packets to the aggregated output buffer, as well as various information associated with content providers 180 and user devices 170. The OS 126 may be any suitable module that controls the general operation of the CMTS 120. The OS 126 may also facilitate the execution of other software modules, for example, the modules associated with the scheduler 130.

In the memory 122, the scheduler 130 may include an identification module 132, a calculation module 134, and a schedule determination module 136. Each of these modules may provide specific functionality associated with distributing content in optimized fashion. Alternatively, one or more of the modules may perform all or at least some of the functionality associated with the other modules.

The scheduler 130 may receive the data packets from content providers 180, store the data packets in respective user queues, and distribute the data packets to the aggregated output buffer. The scheduler 130 may also perform various management functions associated optimized distribution of content. Each of the functions of the scheduler 130 will be discussed in greater detail below.

The identification module 132 may identify information in the data packets. Such information may include a source or provider of the data packets (for example, the content provider device 180), a destination for the data packet (for example, a user location), and a data port on which the data packet was received, each of which may be stored in a tuple associated with the data packet. At least a portion of this information may be analyzed to further identify the data packets. For example, the identification module 132 may analyze the data port to determine a type of the data packet. Possible types of data packets include video data packets, voice data packets, multimedia data packets, text data packets, or other types of formatted data units that may be carried by a packet mode communication network. In addition to determining the type of a data packet based on information associated with a data packet's tuple, the identification module 132 may also identify the type of a data packet based on the data port on which the data packet was received, for example, by the scheduler 130 of the CMTS 120.

In certain embodiments, the identification module 132 may mark or label data packets with information in addition to the information in a data packet's tuple when received by the scheduler 130. For example, the type of a data packet, a predetermined delay associated with a data packet, or other information that may facilitate the optimized transmission of data packets. Various protocols, such as Resource Reservation Protocol (RSVP) or Multiprotocol Label Switching (MPLS), may be used to label the data packets.

The scheduler 130 may store data packets into a queue based on their intended destination, for example, as may be determined from the destination identified in the tuple of the data packet, in one embodiment. Thus, multiple queues (user queues) may exist, for example, one per user. In some embodiments, the user queues may be associated with one or more subqueues, which may further distinguish data packets for each user based at least in part on criteria other than destination, such as the provider of the content or the type of the content, as non-limiting examples.

The calculation module 134 may calculate a fill level (or fill percentage) of an aggregated output buffer to determine whether the aggregated output buffer is being filled optimally with data packets from the user queues. In one embodiment, the calculation module 134 may make such a determination by calculating a ratio of the number of empty slots in the aggregated output buffer to the total bandwidth of the aggregated output buffer, and then comparing the ratio to a predetermined fill level (or fill percentage). If the calculated ratio is less than the predetermined fill level, then the data packets may be sent to the aggregated output buffer according to a schedule. If the ratio is greater than the predetermined fill level, then the data packets may not be sent to the aggregated output buffer according to such a schedule. In other embodiments, data packets may be sent according to an optimized schedule irrespective of the results from the calculation module 134.

The schedule determination module 136 may determine a schedule for sending data packets to the aggregated output buffer. Such a schedule may include sending at least a portion of the data packets after a predetermined delay such that data packets that are not delayed (for example, time dependent data packets) may be accelerated into the aggregated output buffer in the way that the data packets that are not delayed may be sent before data packets that may have ordinarily been sent before them, that is, had the delayed data packets not been delayed. This technique may be referred to as buffering, as used herein. Data packets may be delayed based on various considerations, such as their type (for example, video or data), a time dependency for presenting content associated with the data packets without interruption to a user's use (for example, real-time in some instances) of the content, or other distinguishing information associated with the data packets, as non-limiting examples. The schedule determination module 136 may also monitor fill levels in the aggregated output buffer and adjust the schedule accordingly. For example, if the schedule determination module 136 determines that an aggregated output buffer is being filled at less than a predetermined or desired rate, the schedule determination module 136 may increase the delay for data packets and/or delay one or more additional types of data packets to more optimally fill the aggregated output buffer.

In one embodiment, the schedule determination module 136 may mark or label data packets with a predetermined delay value such that when the scheduler 130 reads the value, the scheduler 130 may delay sending the data packets to the aggregated output buffer for a duration of the indicated delay. Data packets that do not have a predetermined delay value may be sent to the aggregated output buffer without delay, in one embodiment.

The CMTS 120, or the head end controller 150 in some embodiments, may direct or facilitate the transmission or other output of the data packets in the aggregated output buffer via one or more broadband signals for receipt by the user devices 170. In one embodiment, such transmission of data packets may include the CMTS 120 converting the data packets from TCP/IP format to RF format for transmission to user locations as a broadband data signal.

In addition to the CMTS 120, the head end controller device 150, and the one or more computing devices 160, the service provider system 110 may also include any number of other devices or components, such as a conditional access system controller, any number of encryption devices, an electronic program guide data server, an on-demand server, a pay-per-view purchase server, a billing system, a profile server, etc. Such devices or components may be associated with a cable service provider or other service providers, such as a satellite service provider or an Internet service provider.

In certain embodiments, the user devices 170 may be connected to one or more display devices, such as a television or monitor, associated with a user. In other embodiments, the user devices 170 may be embedded, incorporated into, and/or executed on a display device. In operation, the user devices 170 may receive at least a portion of a broadband data signal output by the service provider system 110 and convert at least a portion of the received signal into content that may be displayed or otherwise output by the display device. As desired, the user devices 170 may receive a broadband data signal via any number of suitable service provider networks 105, such as a cable network that includes any number of optical fibers, coaxial cables, and/or cable drops, a satellite network that includes a suitable satellite dish and/or connecting cables, and/or other suitable networks. Additionally, any number of intermediary devices, such as broadband modems, routers, etc., may also be considered user devices by virtue of their location and operability with other user devices, such as such as televisions, other display devices, and computing devices.

Any number of content provider devices 180 may be provided. A content provider 180 may include any number of suitable systems and/or devices configured to output content for receipt by the service provider system 110. For example, a content provider 180 may include a system that facilitates the output of one or more variable bit rate data streams (for example, television content, movies, etc.) that may be received, processed, and delivered as output to user locations by the service provider system 110, as described herein.

The above examples are not meant to be limiting. Many more examples related to managing the distribution of data packets to user locations may exist in other embodiments. While various functions are described above with respect to particular devices, it is understood that these functions may be distributed in many ways across the devices. For example, functionality provided by the CMTS 120 may be provided at least in part by the head end controller 150 or one or more of the computing devices 160.

Figure 2:
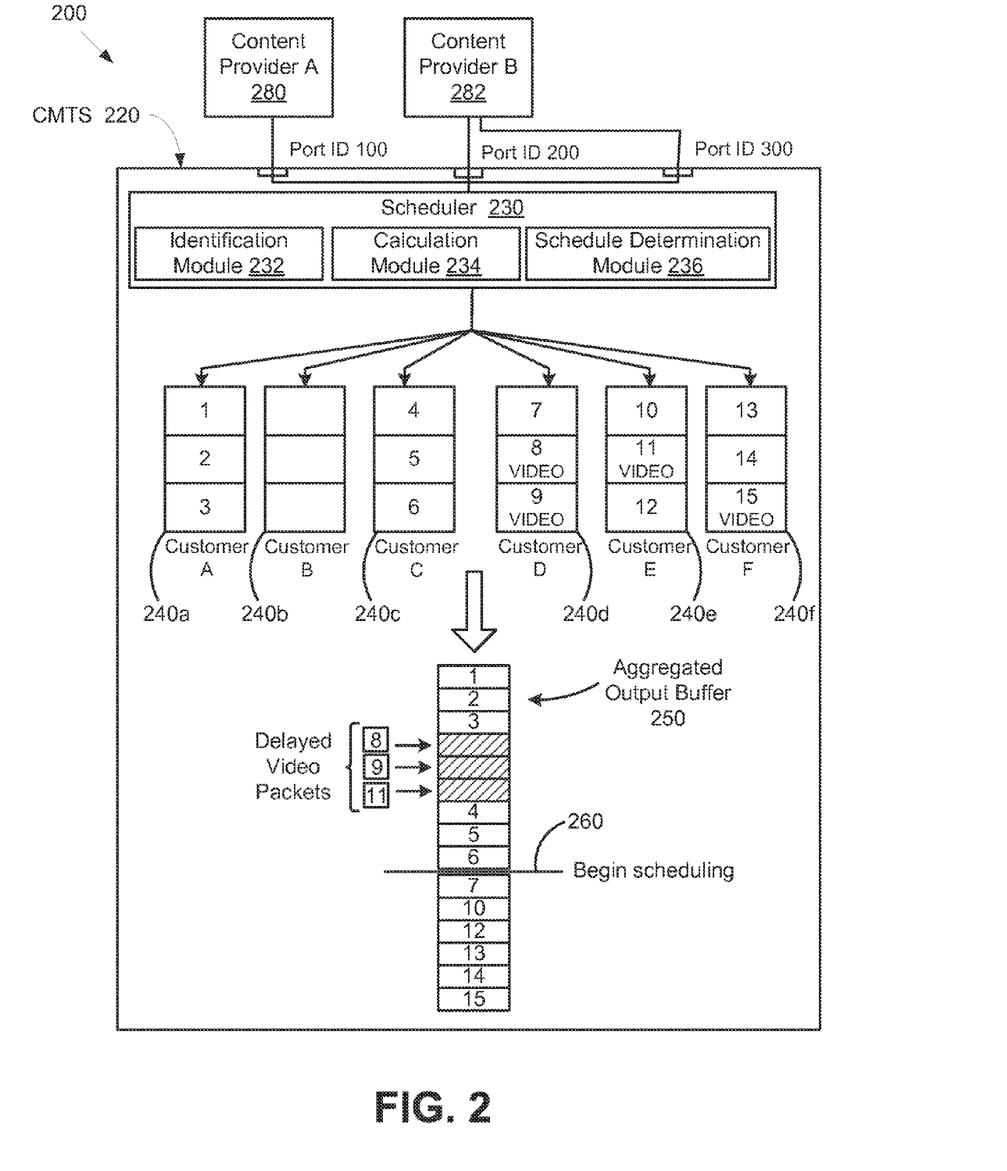
FIG. 2 is a schematic diagram illustrating the handling of data packets to implement optimized transmission of content associated with the data packets, according to an embodiment of the disclosure.

FIG. 2 depicts a schematic diagram illustrating the handling of data packets for optimizing transmission of content associated with the data packets, according to an embodiment of the disclosure. The system 200 may include content provider devices 280 and 282, and a CMTS 220. These devices may communicate with each other via one or more networks, which are not shown for purposes of simplification.

A content provider 280, 282 may generate or distribute content, such as video, text, audio, multimedia, and/or other data to user locations 170 via a service provider 110, as shown in FIG. 1. Example content providers 280, 282 may include, but are not limited to, television networks, web hosting websites, or any user or entity operating a device that is configured to send content to other devices. A service provider 110, such as a cable or satellite service provider, may receive the content and distribute it to one or more devices, such as a set-top box connected to a display such as a television, a computing device, or a video conferencing device for presenting video conferencing content. In some embodiments, content distributed by a service provider may not be received from a content provider. For example, the content may instead be received from a source other than a content provider or may originate at the service provider.

The scheduler 230 may receive data packets from the content providers 280 and 282. The data packets may be received from a data port, for example, data ports 100, 200, and 300. For purposes of illustration, FIG. 2 shows blocks representing data port connections at the CMTS 220. Such ports may be logically defined in the CMTS 220, and therefore, may not be visible as shown in FIG. 2.

In one embodiment, an identifier of a data port may be predetermined such that the content provider may be identified, for example, by the identification module 232, based on the particular data port in the CMTS 220 over which the data packet was received. For example, content may be received from Content Provider A on data port 100 and from Content Provider B on data ports 200 and 300. In one example, any data packet received over data port 100 may be considered to be a video data packet because Content Provider A may be known to be a provider of video data packets, for example, a television network. As another example, any data packet received over data port 200 may be associated with video conferencing and any data packets received over data port 300 may be associated with voice communication, both of which may be provided by Content Provider B. Thus, as illustrated in the queues 240*a*-*f*, video data packets 8, 9, 11, and 15 may have been received over data port 100 (and labeled accordingly as "video"), whereas the other data packets in the queues 240*a*-*f* may not have been received over data port 100 but may have been received over either data ports 200 or 300.

The illustrative example in FIG. 2 shows fifteen data packets (packets 1-15) that were received from Content Providers A and B by the CMTS 220. As shown, the data packets may be stored in queues 240*a*-*f*, for example, by the scheduler 230. Although six queues are shown in FIG. 2, fewer or more queues may exist in other embodiments. In one embodiment, the data packets may be stored in the queues 240*a*-*f* in the order in which they were received. In another embodiment, the data packets may be stored in the queues 240*a*-*f* according to a delay determined for at least some of the data packets, for example, by the schedule determination module 236, as will be discussed in greater detail below.

Each of the queues 240*a*-*f* may correspond to a user, for example, Customer A-F, respectively, for whom the data packets may be intended. Data packets may be therefore stored in the queues 240*a*-*f* based at least in part on the intended customer (or user). As noted above, such information may be included in a tuple for each data packet, which may include a source or provider of the data packet, a destination for the data, and a data port used to communicate the data packet, as non-limiting examples. The tuple may be accessed, for example, by the identification module 232, and utilized to determine the associated queue 240*a*-*f* for each data packet, the manner in which the data packet is sent to an aggregated output buffer 250, as well as the subsequent user location to which to send the data packet.

As an example, the tuple for data packets 8, 9, 11, and 15 may indicate that video data packets 8 and 9 are intended for Customer D (queue 240*d*), video data packet 11 for Customer E (queue 240*e*), and video data packet 15 for Customer F (queue 2400, as shown in FIG. 2. The tuple for data packets 8, 9, 11, and 15 (for example, the data port in the tuple) may be analyzed to determine that these data packets are video data packets, which is indicated by the "video" label in FIG. 2 for ease of explanation. Tuples associated with the other data packets in the queues 240*a*-*f* may be similarly analyzed to associate them with their respective users, as shown in FIG. 2.

Some user queues, such as queue 240*b*, may be empty because data packets associated with Customer B may not yet have been received. Such empty queues may cause empty slots or gaps in the aggregated output buffer 250 when computer-executable instructions are performed, for example, by the scheduler 230, to send the data packets in the user queues 240*a*-*f* to the aggregated output buffer 250 faster than the data packets are being received and subsequently added to the user queues 240*a*-*f* by the scheduler 230. Thus, as shown in FIG. 2, three empty slots in the user queue 240*b* may correspond to three gaps in the aggregated output buffer 250, which may be illustrated as the three cross-lined slots between data packets 3 and 4 in the aggregated output buffer 250. Fewer or more empty slots may exist in user queues in other embodiments. For example, in some embodiments, an empty user queue may correspond to a single gap in an aggregated output buffer.

The aggregated output buffer 250 may represent a single staging area or queue for storing data packets from multiple user queues. The aggregated output buffer 250 may have a certain bandwidth that may determine a number of data packets from the user queues that it may receive. In one embodiment, the bandwidth for the aggregated output buffer 250 may be determined based on the number of QAMs, for example, 6-MHz QAM channels, that may be mapped to the aggregated output buffer 250. According to one configuration, the aggregated output buffer may be sized according to the number of QAMs it feeds. Thus, for purposes of illustration, if eight 6-MHz QAM channels are mapped to the aggregated output buffer 250, a total bandwidth of the aggregated output buffer of 48 MHz may exist. A number of slots in the aggregated output buffer 250 may represent a portion of the bandwidth for receiving a number data packets, which in total, may amount to the total bandwidth of the aggregated output buffer 250.

The data packets in the queues 240*a*-*f* may be sent to the aggregated output buffer 250, for example, by the scheduler 230, in one embodiment. The data packets may be sent to the aggregated output buffer 250 using various techniques, such as FIFO, fair queuing, or weighted fair queuing, as non-limiting examples. According to certain embodiments, such techniques may be applied to initially transmit data packets from the queues 240*a*-*f* to the aggregated output buffer 250 but may be replaced with a technique to buffer or delay packets, as discussed in the example below.

As an example, data packets 1-3 and 4-6, along with empty slots in the queue 240*b*, may be sent to the aggregated output buffer 250. According to an initial configuration, such data packets and empty slots may be sent to the aggregated output buffer 250 using FIFO such that when a scheduler, for example, scheduler 230, reads the queues 240*a*-*f* from top to bottom and left-to-right, figuratively, that is, according to one embodiment, data packets that the scheduler encounters may be sent to the aggregated output buffer 250 in the order encountered. According to this configuration, the aggregated output buffer 250 may include the data packets as shown (for example, above separation line 260, which is used for ease of explanation). Such transmission of data packets from the queues 240*a*-*f* may be described as filling the aggregated output buffer 250. A fill level or percentage may be calculated, for example, by the calculation module 234, based on such filling. For example, above the separation line 260, nine slots are shown in the aggregated output buffer 250, three of which are empty. Based on this example, a fill level or percentage of 67% may exist (for example, 6 slots having data packets/9 total slots).

The calculated fill level may be compared to a desired fill level to determine whether the aggregated output buffer is being filled optimally. In one embodiment, the aggregated output buffer 250 may be considered optimally filled if the calculated fill level is greater than the desired fill level, whereas it may be considered not optimally filled if the calculated fill level is less than the predetermined fill level. In one embodiment, if it is determined that the aggregated output buffer 250 is not being optimally filled, a new technique may be used (for example, buffering or delaying certain data packets) may be implemented to more optimally fill the aggregated output buffer 250. Various other approaches, techniques, or mathematical computations may be performed to determine whether an aggregated output buffer is being optimally filled, in other embodiments.

In the above example, if a predetermined fill level of 80% exists, a determination may be made that the aggregated output buffer 250 is not being optimally filled. In response, according to one embodiment, the data packets may be sent according to a schedule which may include buffering or delaying at least some of the data packets such that other data packets may be accelerated into the aggregated output buffer, while the delayed data packets may be time-sliced into the aggregated output buffer 250 to more optimally fill the aggregated output buffer 250. A determination of which data packets to delay may be based on a type of the data packet (for example, video or data), a time dependency for rendering content associated with the data packets without interruption to a user or user's real-time viewing and/or interaction with the content, or other distinguishing information associated with the data packets.

As an example of time dependency for data packets, data packets that may not be delivered timely (for example, as a result of a delay), may cause pixelization or blurring of images on a display, or unintelligible voice communication over a network, as non-limiting examples. Such occurrences may adversely affect a user's use of the content, and therefore, may be described as time dependent or having a time dependency. Examples of such data packets may include, but are not limited to, voice packets and video conferencing packets. Examples of data packets that may not be time dependent (time independent) may include, but are not limited to, video data packets or electronic mail data packets. Transmission of these types of data packets may not affect a user's viewing and/or interacting with the content. Video data packets, for example, may be buffered or delayed without interruption to a user because the video data packets may be ordinarily buffered in a set-top box before content associated with the data packets are displayed to a user. Because such a buffering process may exist in set-top boxes, an additional delay (for example, up to approximately 50 milliseconds), may not affect a user's viewing experience. In some embodiments, various other criteria in addition to type and the time dependency of a data packet, may be used to classify or group data packets in association with determining a delay for the data packets.

A duration by which to delay a data packet may be determined, for example, by the schedule determination module 236, and may be based on the type of data packet such that some data packets may be delayed for longer or shorter durations of time than other data packets. For example, video data packets may be delayed by one or more durations while electronic mail data packets may be delayed by one or more different durations. The durations of the delays may be adjusted based on the fill level of the aggregated output buffer 250 as compared to a predetermined or desired fill level, in one embodiment. According to one example, as the fill level of the aggregated output buffer increases, the duration of the delay for certain delayed data packets may also decrease, or vice-versa. Numerous other examples, criteria, or determinations may exist in other embodiments.

Returning to the above example in FIG. 2, data packets 7-15 may be sent from the queues 240a-f according to the schedule determined by the schedule determination module 236. For example, a delay (for example, 20 milliseconds) may be implemented for video data packets 8, 9, 11, and 15, whereas no delay may exist for data packets 7, 10, and 12-14. Thus, data packets 7, 10, and 12-14 may be sent to the aggregated output buffer 250 before delayed data packets 8, 9, 11, and 15. According to one configuration, the scheduler 130, upon encountering a video data packet and identifying an associated delay, may move to the next available data packet for transmission (for example, a non-video data packet), send this data packet, and return to the video data packets after their delay duration has been reached, at which time it may send the video data packets to the aggregated output buffer 250. Such video data packets may be used to fill gaps in the aggregated output buffer 250, as shown in FIG. 2, where video data packets 8, 9, and 11 may be inserted into the gaps in the aggregated output buffer 250, or more generally added to the aggregated output buffer 250 such that the number of gaps in the aggregated output buffer 250 may be reduced by the number of data packets sent to the aggregated output buffer 250, e.g., four in the present example. Described another way, the amount of unused bandwidth in the aggregated output buffer 250 may be reduced by the size of each data packet that is sent to the aggregated output buffer.

Delaying video data packets, for example, by up to 50 milliseconds, while not adversely affecting a user's viewing experience of video content associated with the video data packets, may be a sufficient amount of time to allow additional time dependent data packets to be received and delivered to the aggregated output buffer 250 instead of null values associated with empty slots in the queues 240a-f. In this way, data packets may be time-sliced into the aggregated output buffer to more optimally fill the aggregated output buffer.

The data packets in the aggregated output buffer 250 may be sent to their respective user locations, where they may be presented to a user via one or more devices at the user locations. As described, the CMTS 220 may convert the data packets from IP data packets to RF signals for transmission to the user locations.

Figure 3:
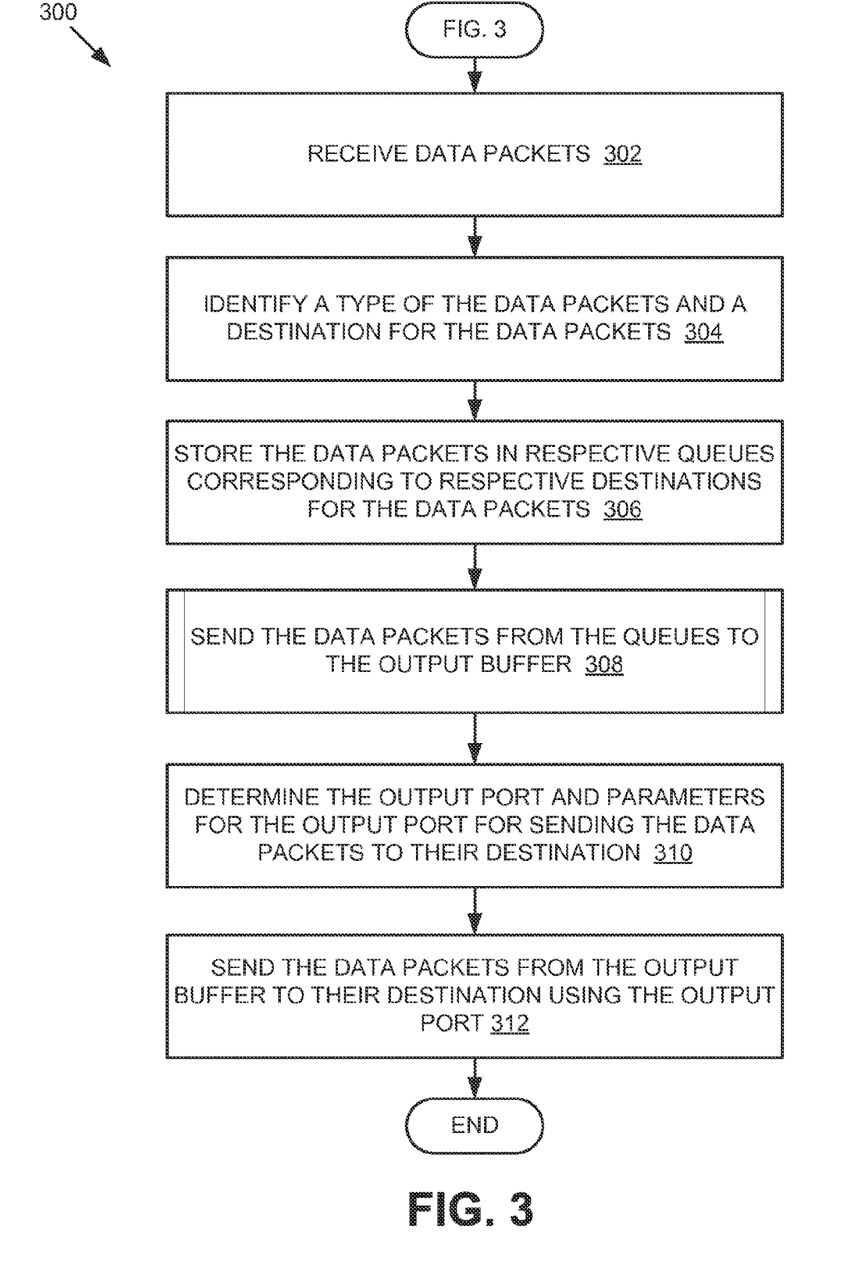
FIG. 3 is a flow diagram of an example method for sending data packets to user locations in optimized fashion, according to an embodiment of the disclosure.

FIG. 3 is a flow diagram of an example method for sending data packets to user locations in optimized fashion, according to an embodiment of the disclosure. The flow diagram 300 may begin at block 302, where data packets may be received from a content provider. Such content may be received by the scheduler 130, in one embodiment. The content provider of the data packets, the type of the data packets (for example, video or data), and the destination for the data packets may be identified, for example, by the identification module 132, at block 304. As described, such information may be indicated in a tuple of the data packet or may be determined from the information in the tuple. For example, the type of the data packet may be determined from the data port indicated in the tuple for the data packets. Alternatively, the type of the data packets may be based on the data port on which the data packets were received, in one embodiment. At block 306, the data packets may be stored in a queue corresponding to an intended destination (for example, a user location) for the data packets. In this way, a queue (or one or more subqueues) may be utilized for storing data packets for each user in a memory of the CMTS service provider system.

At block 308, the data packets may be sent from the user queues to an aggregated output buffer, for example, aggregated output buffer 250. The processes associated with block 308 will be discussed in greater detail below with reference to FIG. 4. At block 310, an output port and associated output port parameters may be determined and utilized to send the data packets to their destination. Parameters for the output port may indicate a physical and/or logical connection from the CMTS 120 to the user location and a speed at which the data packets may be communicated, as non-limiting examples. The data packets may be sent to their destination via the output port, at block 312.

Figure 4:
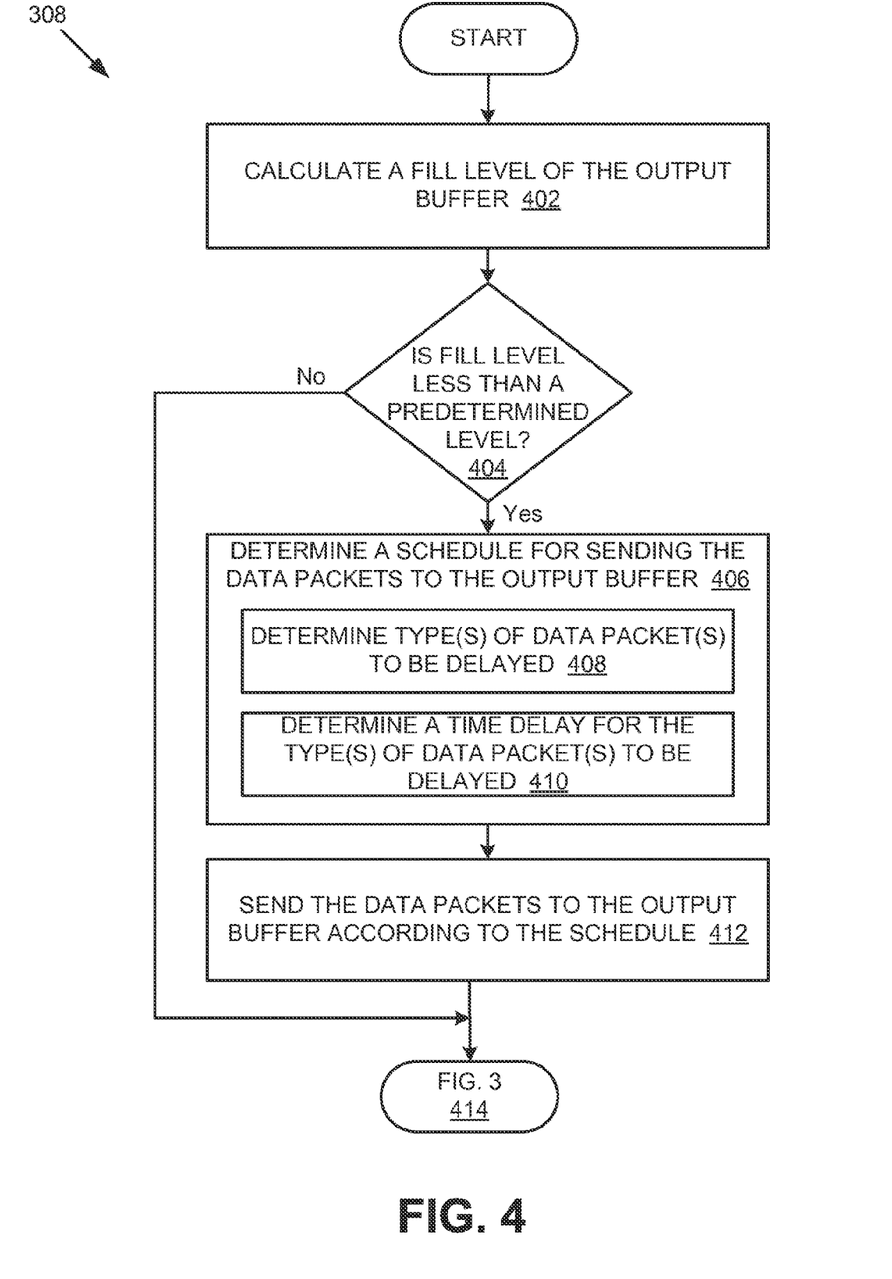
FIG. 4 is a flow diagram of an example method for buffering data packets according to a schedule, according to an embodiment of the disclosure.

FIG. 4 depicts an example flow diagram 308 of a method for buffering or delaying data packets according to a schedule, in one embodiment of the disclosure. The flow diagram may begin at block 402, where a fill level or percentage associated with the aggregated output buffer may be calculated. As described, such a fill level may be calculated by dividing the number of data packets stored in the aggregated output buffer by the total number of slots, or portions of bandwidth for storing data packets. The fill level may be compared to a predetermined or desired level and, if the fill level is not less than the predetermined fill level, which may imply that the aggregated output buffer is being filled optimally, then processing may return to block 310 of FIG. 3.

If the fill level is less than the predetermined level, then the remaining data packets in the user queues may be scheduled for sending to the aggregated output buffer according to a certain configuration, for example, as determined by the schedule determination module 136. For example, at block 408, a determination may be made to delay one or more types of data packets. In one embodiment, such data packets may be time independent because their delay may not adversely impact or interrupt a user's use of content associated with the data packets. An example such data packet may be a video data packet received by a set-top box at a user location. Such data packets may include video data packets and electronic mail data packets, as non-limiting examples. A predetermined time delay for each of the data packets may be established at block 410. At block 412, the data packets may be sent to the aggregated output buffer according to the determined schedule, which may include delaying the sending of certain data packets for the duration of the predetermined delay. The delay may enable time dependent data packets to be accelerated into the aggregated output buffer while less dependent data may be time-sliced into the aggregated output buffer to more optimally fill the aggregated output buffer.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

The computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
    at least one memory configured to store computer-executable instructions; and
    at least one processor configured to access the at least one memory and execute the computer-executable instructions to:
        receive a plurality of data packets associated with content for multiple user queues;
        identify a type of each of the plurality of data packets and a destination for each of the plurality of data packets;
        store one or more data packets of the plurality of data packets in a respective queue associated with a destination for the one or more data packets;
        determine a schedule for sending the one or more data packets to fill an aggregated output buffer, wherein the aggregated output buffer comprises data packets from the multiple user queues and has a bandwidth frequency that is sized to fill one or more Quadrature Amplitude Modulation (QAM) channels for transmitting the one or more data packets to the destination;
        send a first data packet of the one or more data packets to the aggregated output buffer based at least in part on the schedule;
        determine a bandwidth of the aggregated output buffer;
        calculate a fill level of the aggregated output buffer based at least in part on the bandwidth;
        determine a time delay for a second data packet of the one or more data packets indicative of a time after the first data packet is sent at which to send the second data packet, wherein the time delay is based at least in part on the fill level of the aggregated output buffer; and
        based at least in part on the time delay, send the second data packet to the aggregated output buffer;
        wherein sending the second data packet reduces a number of empty slots in the output buffer.

2. The system of claim 1, wherein the first data packet and the second data packet are time independent.

3. The system of claim 1, wherein the first data packet and the second data packet are the same type of data packet.

4. The system of claim 1, wherein the sending of the one or more data packets according to the schedule fills the output buffer to a level that is greater than a predetermined fill level.

5. The system of claim 1, wherein type of the one or more data packets is based at least in part on a data port on which the one or more data packets are received.

6. The system of claim 1, the at least one processor further configured to execute the computer-executable instructions to send the one or more data packets from the aggregated output buffer to a destination for each of the one or more data packets via the one or more QAM channels.

7. The system of claim 6, wherein the destination comprises customer premise equipment for presenting the content associated with the one or more data packets.

8. A method comprising:
receiving, at a cable provider system comprising one or more computers, a plurality of data packets associated with content for multiple user queues from a content provider;
identifying, by the cable provider system, the content provider, a type of each of the plurality of data packets, and a destination for each of the plurality of data packets;
storing, by the cable provider system, one or more data packets of the plurality of data packets in a respective queue associated with a destination for the one or more data packets;
determining, by the cable provider system, a bandwidth frequency of an aggregated output buffer comprising data packets from the multiple user queues, wherein the bandwidth frequency of the aggregated output buffer is sized to fill one or more Quadrature Amplitude Modulation (QAM) channels for transmitting the one or more data packets to the destination;
sending, by the cable provider system, a first data packet of the one or more data packets to the aggregated output buffer based at least in part on the bandwidth frequency;
calculating, by the cable provider system, a fill level of the aggregated output buffer based at least in part on the bandwidth; and
determining, by the cable system provider, a time delay for the second data packet of the one or more data packets indicative of a time after the first data packet is sent at which to send the second data packet, wherein the time delay is based at least in part on the fill level; and
scheduling, by the cable system provider, the sending of the second data packet to the aggregated output buffer based at least in part on the time delay;
wherein sending the second data packet reduces a number of empty slots in the aggregated output buffer.

9. The method of claim 8, wherein the second data packet and the first data packet are time dependent.

10. The method of claim 8, wherein the first data packet and the second data packet are the same type of data packet.

11. The method of claim 8, wherein the content provider and the type of the one or more data packets are based at least in part a data port on which the one or more data packets are received.

12. The method of claim 8, further comprising sending, by the cable provider system, the one or more data packets from the aggregated output buffer to a destination for each of the one or more data packets via the one or more QAM channels.

13. The method of claim 8, wherein the destination comprises customer premise equipment for presenting the content associated with the one or more data packets.

14. One or more non-transitory computer-readable media storing computer-executable instructions that, when executed by at least one processor, configure the at least one processor to perform operations comprising:
receiving a plurality of data packets associated with content for multiple user queues from a content provider;
identifying the content provider, a type of each of the plurality of data packets, and a destination for each of the plurality of data packets, wherein the type is based at least in part on a data port on which the plurality of data packets are received;
scheduling the sending of one or more data packets of the plurality of data packets to fill an aggregated output buffer, wherein the aggregated output buffer comprises data packets from the multiple user queues has a bandwidth frequency that is sized to fill one or more Quadrature Amplitude Modulation (QAM) channels for transmitting the one or more data packets to the destination, wherein the scheduling comprises:
sending a time dependent data packet;
determining a time delay for a time independent data packet indicative of a time after the time dependent data packet is sent at which to send the time independent data packet, wherein the time delay is based at least in part on a fill level of the aggregated output buffer; and
sending the time independent data packet after the time dependent data packet and the time delay;
determining a bandwidth of the aggregated output buffer; and
calculating the fill level of the aggregated output buffer based at least in part on the bandwidth;
wherein sending the second data packet reduces a number of empty slots in the output buffer.

15. The one or more non-transitory computer-readable media of claim 14, wherein the time independent data packet is a video data packet.

16. The one or more non-transitory computer-readable media of claim 14, wherein the sending of the one or more data packets according to the scheduling optimally fills the aggregated output buffer.

17. The one or more non-transitory computer-readable media of claim 14, the at least one processor further configured to perform the operations comprising storing the one or more data packets in a respective queue associated with a destination for the one or more data packets.

18. The one or more non-transitory computer-readable media of claim 14, the at least one processor further configured to perform the operations comprising sending, from the aggregated output buffer, the one or more data packets to the destination, wherein the destination comprises customer premise equipment for presenting the content associated with the one or more data packets.

19. The one or more non-transitory computer-readable media of claim 14, the at least one processor further configured to perform the operations comprising converting the one or more data packets to a respective radio frequency signal for transmission to a destination for the one or more data packets.

* * * * *